June 5, 1923.
S. C. NELSON
GRASS ERADICATOR
Filed April 7, 1922
1,457,996
2 Sheets-Sheet 2
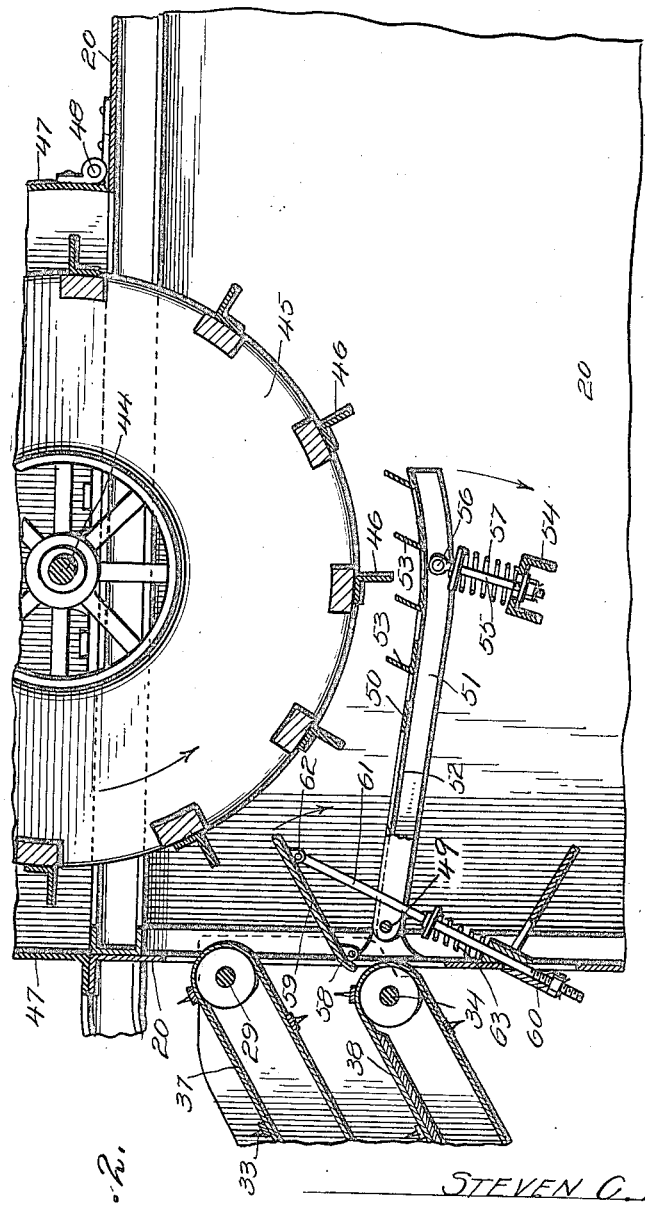
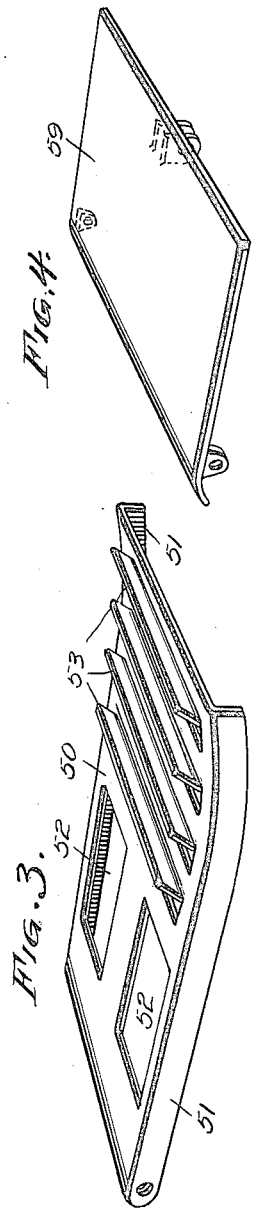
STEVEN C. NELSON
INVENTOR.
BY
ATTORNEY.

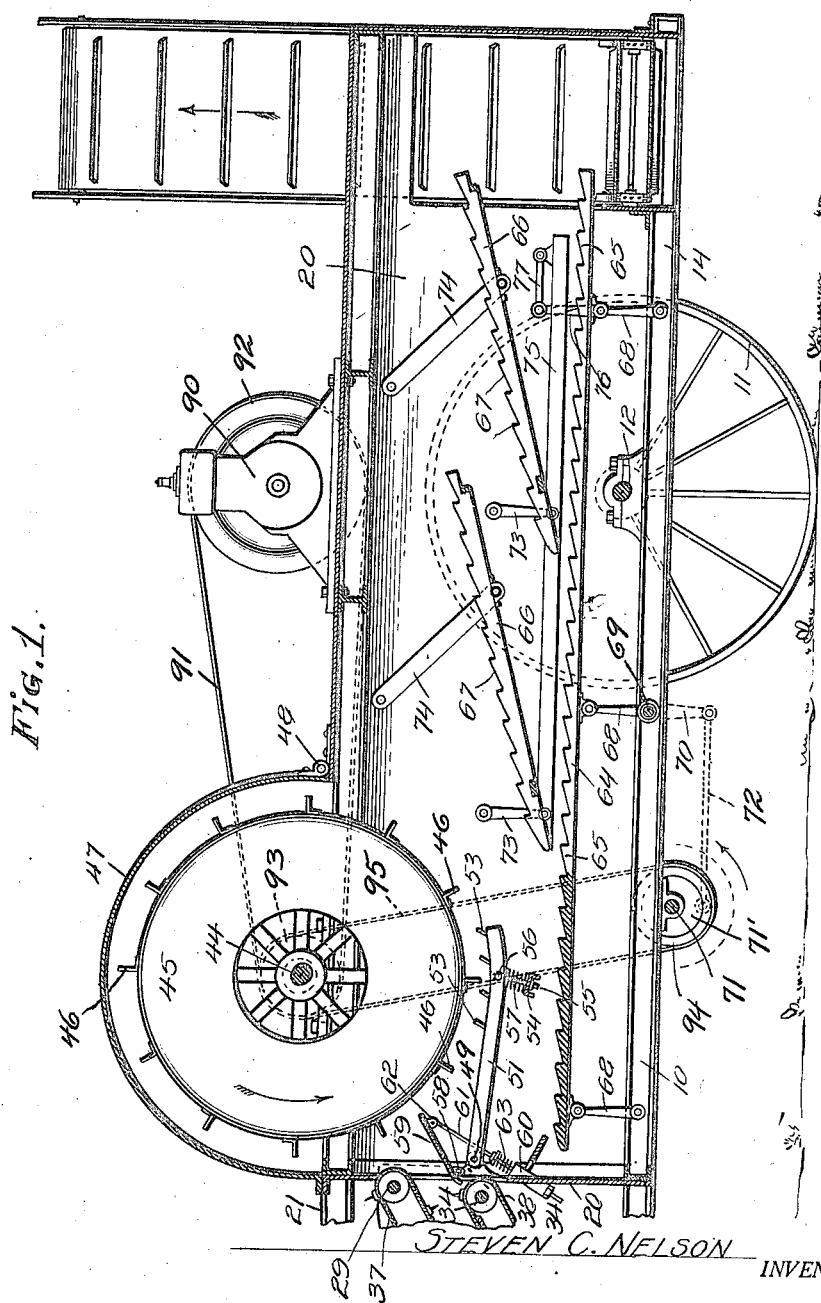

Patented June 5, 1923.

1,457,996

UNITED STATES PATENT OFFICE.

STEVEN C. NELSON, OF FINLEY, NORTH DAKOTA.

GRASS ERADICATOR.

Application filed April 7, 1922. Serial No. 550,453.

*To all whom it may concern:*

Be it known that I, STEVEN C. NELSON, a citizen of the United States, residing at Finley, in the county of Steele and State of North Dakota, have invented certain new and useful Improvements in Grass Eradicators, of which the following is a specification.

This invention relates to deleterious weed eradicators, more particularly for eradicating quack grass and the like, and has one of its objects to provide an apparatus whereby the objectional growths after being excavated together with the earth clinging to the roots, are separated the earth being returned to the ground and the growths deposited in a receptacle from which they may be removed and destroyed.

Another object of the invention is to provide a device of this character including a slatted cylinder, a swinging concave device yieldably supported and having retarding slats, means for feeding the excavated material to the cylinder and concave device, and a yieldable baffle member between the feeding means and the cylinder.

With these and other objects in view the invention consists in certain novel features of construction as hereinafter shown and described and then specifically pointed out in the claims, and in the drawings illustrative of the preferred embodiment of the invention:—

Fig. 1 is an enlarged longitudinal section of the rear portion of the improved apparatus.

Fig. 2 is an enlarged sectional detail of a portion of the cylinder, feed conveyors, concave, and baffle members illustrating the construction more fully.

Fig. 3 is a detached perspective view of the swinging concave device.

Fig. 4 is a detached perspective view of the swinging baffle device.

The improved apparatus comprises a supporting frame, represented as a whole at 10 and supported on traction wheels 11, and axle 12 near the rear end of the frame.

Rising from the frame 10 rearwardly of the center, is a housing or shell 20, and mounted for rotation upon the forward end of the housing 20 is a transverse shaft 29.

Swinging upon the shaft 29 are side members 33, in spaced relation, and mounted for rotation in the sides 33 is a shaft 34. The shafts 29 and 34 carry drums over which endless slatted belts 37 and 38 operate, the two belts being arranged in parallel relation.

Mounted for rotation on the housing 20 is a shaft 44, and mounted on the shaft is a drum or cylinder 45 having marginal slats or blades 46.

The slatted cylinder operates through an opening in the upper side of the housing 20, and bearing over the upper side of the cylinder is a hood or shield 47 preferably hingedly coupled at one side as at 48 to the housing, to render the upper portion of the cylinder freely accessible when required.

Pivoted at 49 within the housing near the conveyor device is a "concave" member, preferably formed of a sheet of metal 50 with a portion curved to conform substantially to the curvature of the cylinder 45. The sheet 50 is downturned at the edges as shown at 51 to stiffen and strengthen it, and is likewise formed with relatively large openings 52.

Formed in the curved portion of the plate 50 are a plurality of elongated U-shaped clefts whereby fins or blades 53 are released and bent up as shown, to form retarders coacting with the slats 46 of the cylinder.

Extending between the sides of the housing 20 is a supporting bar 54, and supported in the bar is a bolt 55, the latter pivoted at its upper end at 56, to the concaved member and surrounded by the spring 57. By this means the concave member is yieldably supported at its free end.

Pivoted at 58 to the housing member 20 near the discharge end of the belt 38, is a baffle plate 59 projecting toward the cylinder 45 and normally bridging the gap between the cylinder and the discharge ends of the elevator belts 37 and 38.

Attached to the front wall of the housing 20 is a guide member 60, and slidable through the said guide is a rod 61 pivoted at 62 at its upper end to the baffle member 59, with a compression spring 63 surrounding the rod and operating to yieldably maintain it in elevated position.

Disposed within the housing 20 near its lower portion, is a horizontal rack 64 formed with transverse ribs 65, and a plurality of shorter inclined racks 66 having transverse ribs 67. The main horizontal rack 64 is supported by rocker arms 68. The intermediate arm 68 is connected to a transverse rocker shaft 69 and attached to this shaft is a depending arm 70.

Mounted for rotation beneath the frame 10 is a transverse shaft 71 having a crank wheel 71' at one end coupled by a rod 72 to the arm 70.

At their lower ends the inclined rack members 66 are supported on rocker arms 73 and suspended at their upper ends by radius bars 74. At their lower ends the rocker bars 73 are connected by a rod 75.

The rocker arms 68 at the rear end of the horizontal rack member 64 is extended upwardly as at 76 and coupled by a rod 77 to the rod 75.

By this means the rotation of the shaft 71 will communicate the necessary vibratory movement to the rack.

A motor of suitable strength and power will be employed, and indicated conventionally at 90, and coupled by suitable means, such as belts or chains 91 and pulleys 92 and 93 to the shaft 44 of the cylinder 45, and by belt 95 to the drive shaft 71.

As the machine is drawn forward by any suitable power, the noxious growths are fed together with the soil adhering to the roots into the space between the conveyor belts 37 and 38. The material discharged over the upper or "tail" end of the elevators as it is deposited on the baffle member 59 and on into the paths of the slats, where it is effectually disintegrated first by the coaction of the blades 46 and the baffle member 59 and also by the coaction of the blades 46 and the retarder blades 16. The clods of grass and like material as they are fed over the baffle member 59 are caught by the slats 46 and thrown against the retarding members 53 and thoroughly and effectually disintegrated and the roots and grass or other stalks separated from the earth and the latter sifted through the openings in the concave member upon the rapidly vibrating rack members and carried thence to the rear and discharged into a wagon or other receptacle not shown.

The springs 63 and 57 will be of sufficient strength to resist the passage of ordinary material, but in event of large stones or the like being gathered up by the excavator, the baffle member 59 and the concave member 51 will yield and permit such articles to pass through without breaking the slats 46 or 53.

The improved device is simple in construction, can be constructed of any size or of any suitable material.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention what is claimed as new is:

1. In a machine of the class described, a slatted cylinder mounted for rotation, a concave device having alternating slots and retarding fins coacting with the slats of the cylinder, means for swingingly supporting said concave device at one end, means for yieldably supporting said concave device at the other end, means for feeding material to the cylinder and concave device, and a baffle member yieldably supported between the feeding means and the cylinder.

2. In a machine of the class described, a slatted cylinder mounted for rotation, a concave device having alternating slots and retarding fins coacting with the slats of the cylinder, means for swingingly supporting said concave device at one end, means for yieldably supporting said concave device at the other end, coacting slatted belts in spaced relation and operating to feed material to the cylinder, and a baffle member yieldably supported between the feeding means and the cylinder.

3. In a machine of the class described, a slatted cylinder mounted for rotation, a concave device having retarding fins coacting with the slats of the cylinder, coacting slatted belts in spaced relation and operating to feed material to the cylinder, a baffle member yieldably supported between the feeding means and the cylinder, and rack devices to receive the material discharged from the cylinder and the concave device.

4. In a machine of the class described, a supporting frame, a slatted cylinder mounted for rotation on said frame in position to receive the material to be treated, a concave device including a plurality of retarding fins coacting with said cylinder, a baffle member between the discharge of the conveyor belts and the cylinder, means for yieldably supporting said concave device, and means for yieldably supporting said baffle member.

5. In a machine of the class described, a slatted cylinder mounted for rotation, a concave device having retarding fins coacting with the slats of the cylinder, means for swingingly supporting said concave device at one end, means for yieldably supporting said concave device at the other end, means for feeding material to the cylinder and concave device, and a baffle member yieldably supported between the feeding means and the cylinder.

In testimony whereof, I affix my signature hereto.

STEVEN C. NELSON.